US012717270B2

(12) United States Patent
Wang et al.

(10) Patent No.: US 12,717,270 B2

(45) Date of Patent: Aug. 25, 2026

(54) METHOD OF ASSEMBLING DEVELOPING CARTRIDGE

(71) Applicant: BROTHER KOGYO KABUSHIKI KAISHA, Nagoya (JP)

(72) Inventors: Yuwen Wang, Nagoya (JP); Isao Kishi, Nagoya (JP); Shuhei Hatano, Komaki (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 635 days.

(21) Appl. No.: 18/347,889

(22) Filed: Jul. 6, 2023

(65) Prior Publication Data

US 2023/0350338 A1 Nov. 2, 2023

Related U.S. Application Data

(63) Continuation of application No. PCT/JP2022/002143, filed on Jan. 21, 2022.

(30) Foreign Application Priority Data

Jan. 29, 2021 (JP) ................................ 2021-013472

(51) Int. Cl.

*G03G 21/18* (2006.01)
*G03G 15/08* (2006.01)

(52) U.S. Cl.

CPC ....... *G03G 21/181* (2013.01); *G03G 15/0865* (2013.01); *G03G 15/0894* (2013.01); *G03G 2215/00987* (2013.01)

(58) Field of Classification Search

CPC ....... G03G 21/181; G03G 2215/00987; G03G 2215/00991; G03G 2215/00995; G03G 2215/0855–0863; G03G 2221/1876

See application file for complete search history.

(56) References Cited

U.S. PATENT DOCUMENTS

| | | | |
|---|---|---|---|
| 6,256,467 | B1 | 7/2001 | Yokomori et al. |
| 2015/0093146 | A1 | 4/2015 | Sato et al. |

(Continued)

FOREIGN PATENT DOCUMENTS

| | | | |
|---|---|---|---|
| CN | 1205460 | A | 1/1999 |
| CN | 104541212 | A | 4/2015 |

(Continued)

OTHER PUBLICATIONS

International Search Report issued in related PCT/JP2022/002143, mailed Mar. 22, 2022.

(Continued)

*Primary Examiner* — Carla J Therrien

(74) *Attorney, Agent, or Firm* — Merchant & Gould P.C.

(57) ABSTRACT

There is provided a method of assembling a developing cartridge including a casing, first and second cams, and a resiliently urging member. The casing has a through-hole extending in a first direction. The shaft extends in the first direction and is movable in the first direction relative to the casing. The first and second cams are positioned at one end portion and another end portion of the shaft, and are movable together with the shaft in the first direction. The resiliently urging member is attached to the another end portion of the shaft and is positioned between the casing and the second cam. The method includes: attaching the first cam to the one end portion of the shaft; inserting the shaft in the through-hole; and attaching the resiliently urging member to the another end portion of the shaft while the first cam contacts a jig in the first direction.

8 Claims, 11 Drawing Sheets

(56) References Cited

U.S. PATENT DOCUMENTS

| | | | | |
|---|---|---|---|---|
| 2017/0090404 | A1* | 3/2017 | Yoshikawa | G03G 21/181 |
| 2019/0302674 | A1 | 10/2019 | Wang et al. | |
| 2019/0302682 | A1 | 10/2019 | Wang et al. | |
| 2020/0103821 | A1 | 4/2020 | Wang et al. | |
| 2020/0125007 | A1 | 4/2020 | Yokoi | |
| 2020/0326653 | A1 | 10/2020 | Wang et al. | |
| 2021/0341855 | A1 | 11/2021 | Ooka | |
| 2021/0341876 | A1* | 11/2021 | Iwasa | G03G 21/1647 |
| 2021/0349421 | A1* | 11/2021 | Ooka | G03G 21/1821 |

FOREIGN PATENT DOCUMENTS

| | | | |
|---|---|---|---|
| CN | 110320772 | A | 10/2019 |
| JP | 10-91052 | A | 4/1998 |
| JP | 2007-206116 | A | 8/2007 |
| JP | 2010-243771 | A | 10/2010 |
| JP | 2017-173405 | A | 9/2017 |
| JP | 2019-8091 | A | 1/2019 |
| JP | 2019-179128 | A | 10/2019 |
| JP | 2019-179131 | A | 10/2019 |
| JP | 2020-101585 | A | 7/2020 |
| JP | 2020-166003 | A | 10/2020 |

OTHER PUBLICATIONS

International Preliminary Report on Patentability issued in corresponding International Patent Application No. PCT/JP2022/002143, Jul. 31, 2023.

Extended European Search Report issued in corresponding European Patent Application No. 22745737.1, Nov. 14, 2024.

* cited by examiner

METHOD OF ASSEMBLING DEVELOPING CARTRIDGE

REFERENCE TO RELATED APPLICATIONS

This is a continuation application of International Application No. PCT/JP2022/002143 filed on Jan. 21, 2022 which claims priority from Japanese Patent Application No. 2021-013472 filed on Jan. 29, 2021. The entire contents of the earlier applications are incorporated herein by reference.

BACKGROUND ART

Conventionally, an electrophotographic type image forming apparatus such as a laser printer and an LED printer has been well known in the art. A developing cartridge is used in the image forming apparatus. The developing cartridge includes a developing roller configured to supply developing agent. One conventional image forming apparatus includes a drawer. The drawer includes a photosensitive drum. The developing cartridge is configured to be attached to the drawer. Upon attachment of the developing cartridge to the drawer, the photosensitive drum and the developing roller contact with each other.

DESCRIPTION

In the image forming apparatus disclosed in the Patent Literature 1, a separating operation is configured to be performed to temporarily separate the developing cartridge from the photosensitive drum. To perform the separating operation, the developing cartridge includes a shaft, a first cam, a second cam, and a resiliently urging member. The first cam is attached to one end portion of the shaft. The second cam and the resiliently urging member are attached to another end portion of the shaft. The shaft is movable relative to a casing of the developing cartridge.

For manufacturing or recycling the developing cartridge, conceivably, the resiliently urging member is attached to the other end portion of the shaft after the shaft is attached to the casing. However, since the shaft is movable relative to the casing of the developing cartridge, the shaft may be displaced relative to the casing when the resiliently urging member is attached to the other end portion of the shaft. This poses a problem that attaching the resiliently urging member to the other end portion of the shaft may become difficult.

It is an object of the present disclosure to provide a technique that can facilitate attachment of the resiliently urging member to the shaft that is movable relative to the casing.

In order to attain the above and other objects, according to one aspect, the disclosure provides a method of assembling a developing cartridge, the developing cartridge including: a casing configured to accommodate developing agent and having a through-hole extending in a first direction; a shaft extending in the first direction through the through-hole and movable in the first direction relative to the casing; a first cam positioned at one end portion of the shaft in the first direction and movable together with the shaft in the first direction relative to the casing; a second cam positioned at another end portion of the shaft in the first direction and movable together with the shaft in the first direction relative to the casing; and a resiliently urging member attached to the another end portion of the shaft and positioned between the casing and the second cam, the resiliently urging member being configured to expand and compress in the first direction. The method of assembling is characterized by including steps of: (a) attaching the first cam to the one end portion of the shaft; (b) inserting the shaft to which the first cam is attached in the through-hole after the step (a); and (c) after the step (b), attaching the resiliently urging member to the another end portion of the shaft in a state where the first cam is in contact with a jig in the first direction and in a direction from the one end portion toward the another end portion of the shaft.

With the above configuration, the shaft can be fixed in position in the first direction by making the jig in contact with the first cam. Hence, the resiliently urging member can be easily attached to the another end portion of the shaft.

Hereinafter, an embodiment according to the present disclosure will be described with reference to accompanying drawings.

Incidentally, in the following description, an extending direction of a shaft will be referred to as a "first direction". Further, a direction in which one end portion of a casing where a developing roller is positioned and another end portion of the casing are aligned with each other will be referred to as a "second direction". The first direction and the second direction cross each other (preferably, perpendicular to each other).

1. Structure of Image Forming Apparatus

Figure 1:
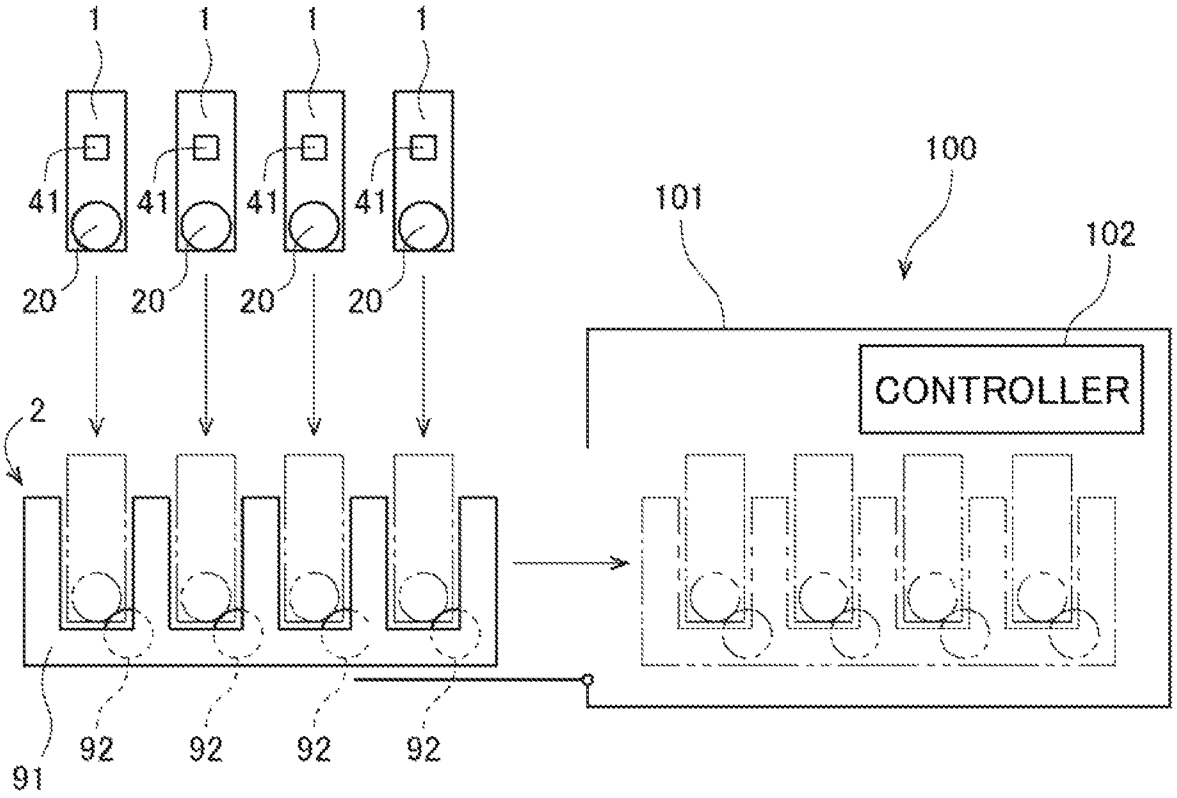
FIG. 1 is a conceptual diagram of an image forming apparatus.

FIG. 1 is a conceptual diagram of an image forming apparatus 100. The image forming apparatus 100 is an electro-photographic type printer. A laser printer and an LED printer are given as examples of the image forming apparatus 100. As illustrated in FIG. 1, the image forming apparatus 100 includes a main frame 101, a controller 102, a drum unit 2, and four developing cartridges 1.

Figure 2:
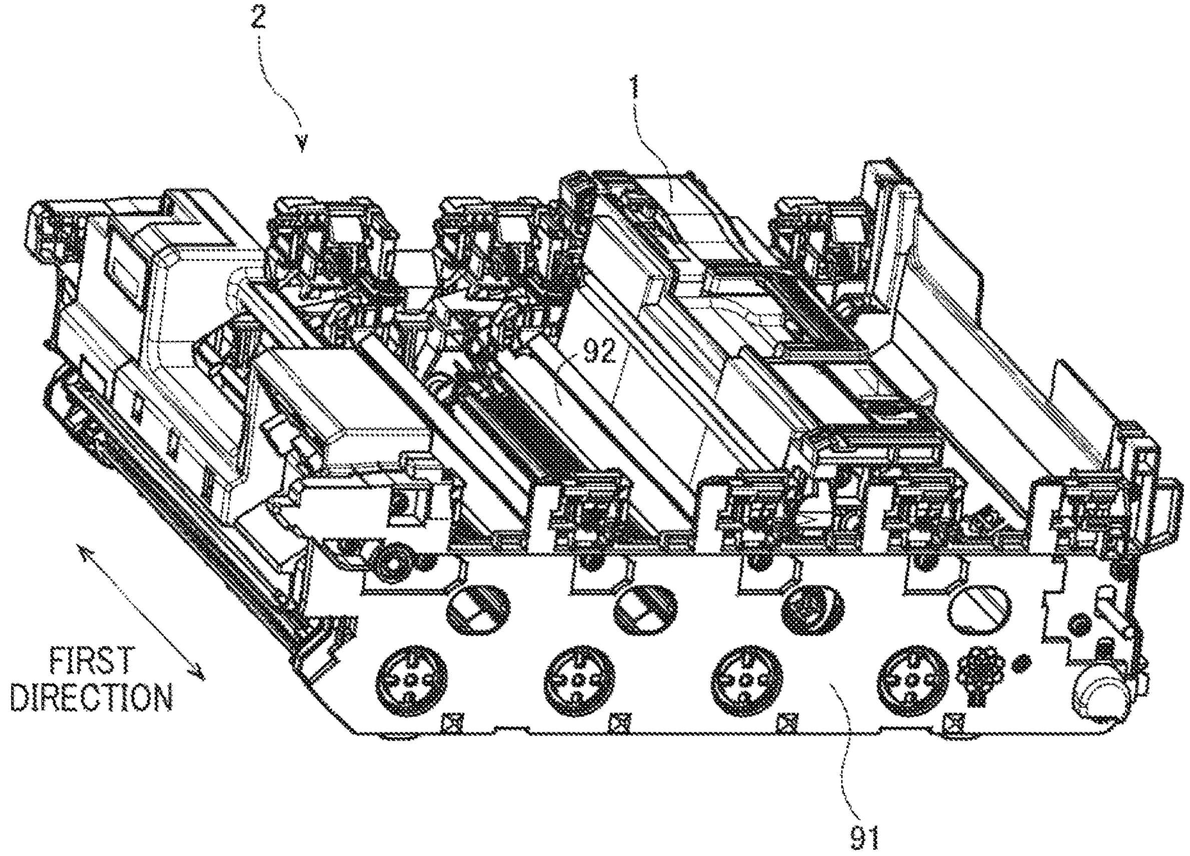
FIG. 2 is a perspective view of a drum unit and a developing cartridge.

FIG. 2 is a perspective view of the drum unit 2 and one developing cartridge 1. As illustrated in FIGS. 1 and 2, the drum unit 2 includes a drum frame 91 and four photosensitive drums 92. The four developing cartridges 1 are attachable to the drum frame 91. That is, the drum unit 2 according to the present embodiment is a drawer to which the four developing cartridges 1 are attachable. The drum unit 2 having the four photosensitive drums 92 attached thereto can be attached to the main frame 101.

The four developing cartridges 1 respectively accommodate therein developing agent of four different colors (for example, the colors of cyan, magenta, yellow and black).

The developing agent is toner, for example. The image forming apparatus 100 is configured to form an image on a surface of a printing sheet with the developing agent supplied from the developing cartridges 1. However, the number of the developing cartridges 1 to be attached to the drum unit 2 may be one through three, or not less than five.

As illustrated in FIG. 1, each of the four developing cartridges 1 includes a memory 41. The memory 41 is a storage medium configured to read and write information. The memory 41 is an IC chip, for example. In a case where the drum unit 2 to which the four developing cartridges 1 are attached is attached to the image forming apparatus 100, the memory 41 of each developing cartridge 1 is electrically connected to the controller 102 of the image forming apparatus 100.

The controller 102 includes a processor, such as a CPU. The controller 102 is configured to perform a printing process in the image forming apparatus 100 in accordance with the operation of the processor based on programs. Further, the controller 102 is also configured to read information stored in the memory 41 and write information in the memory 41.

2. Developing Cartridge

Figure 3:
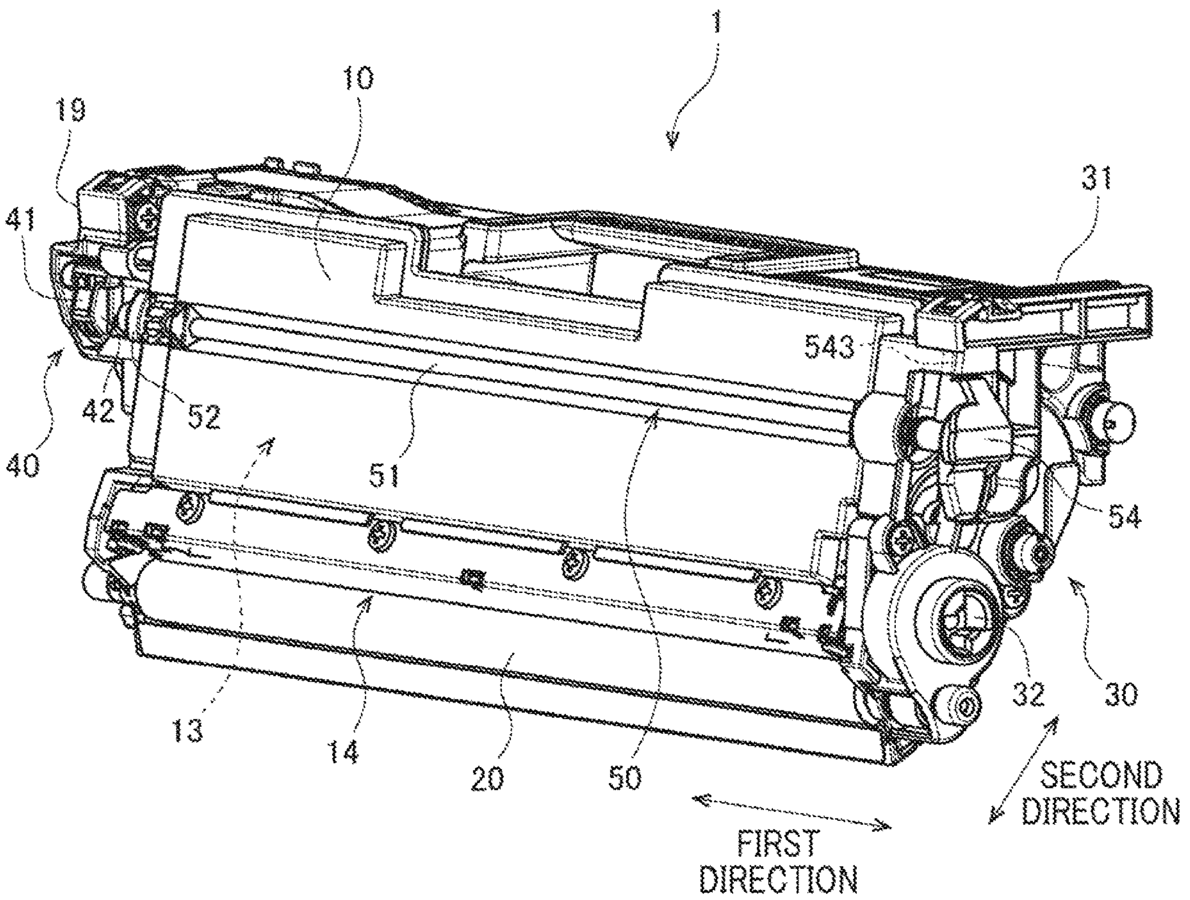
FIG. 3 is a perspective view of the developing cartridge.
Figure 4:
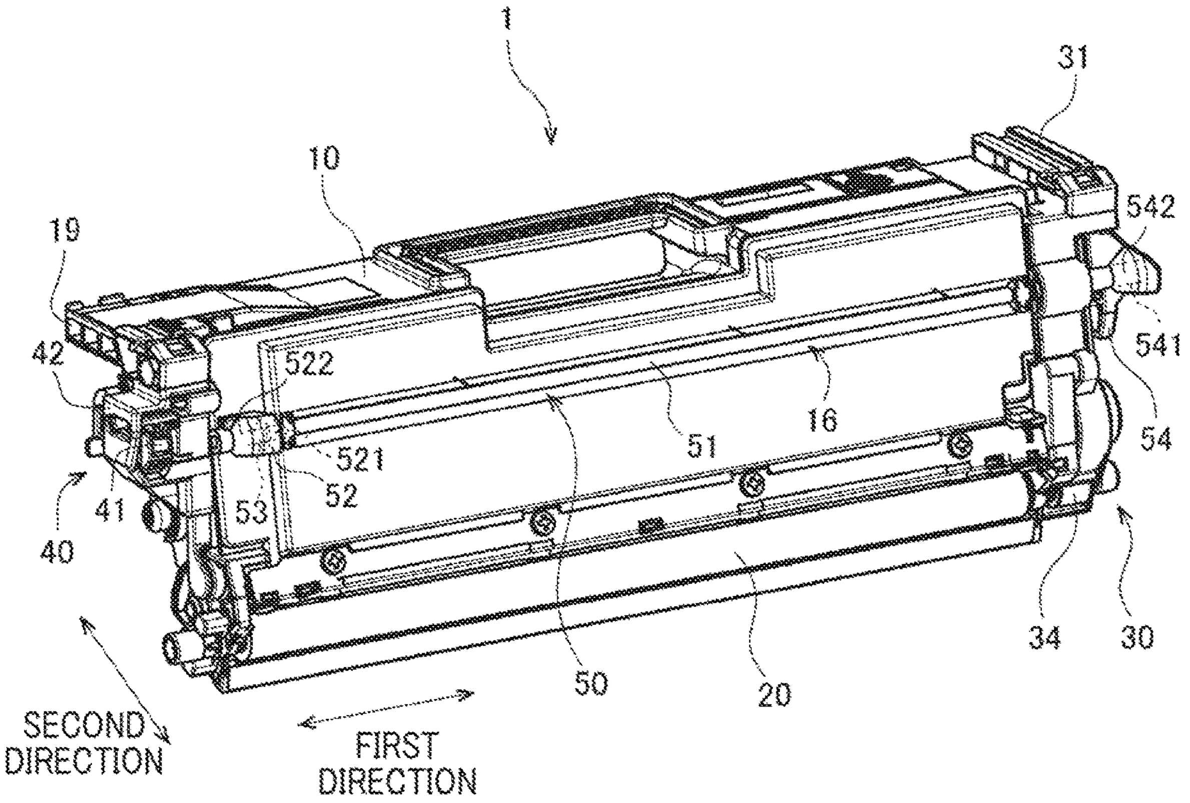
FIG. 4 is a perspective view of the developing cartridge.
Figure 5:
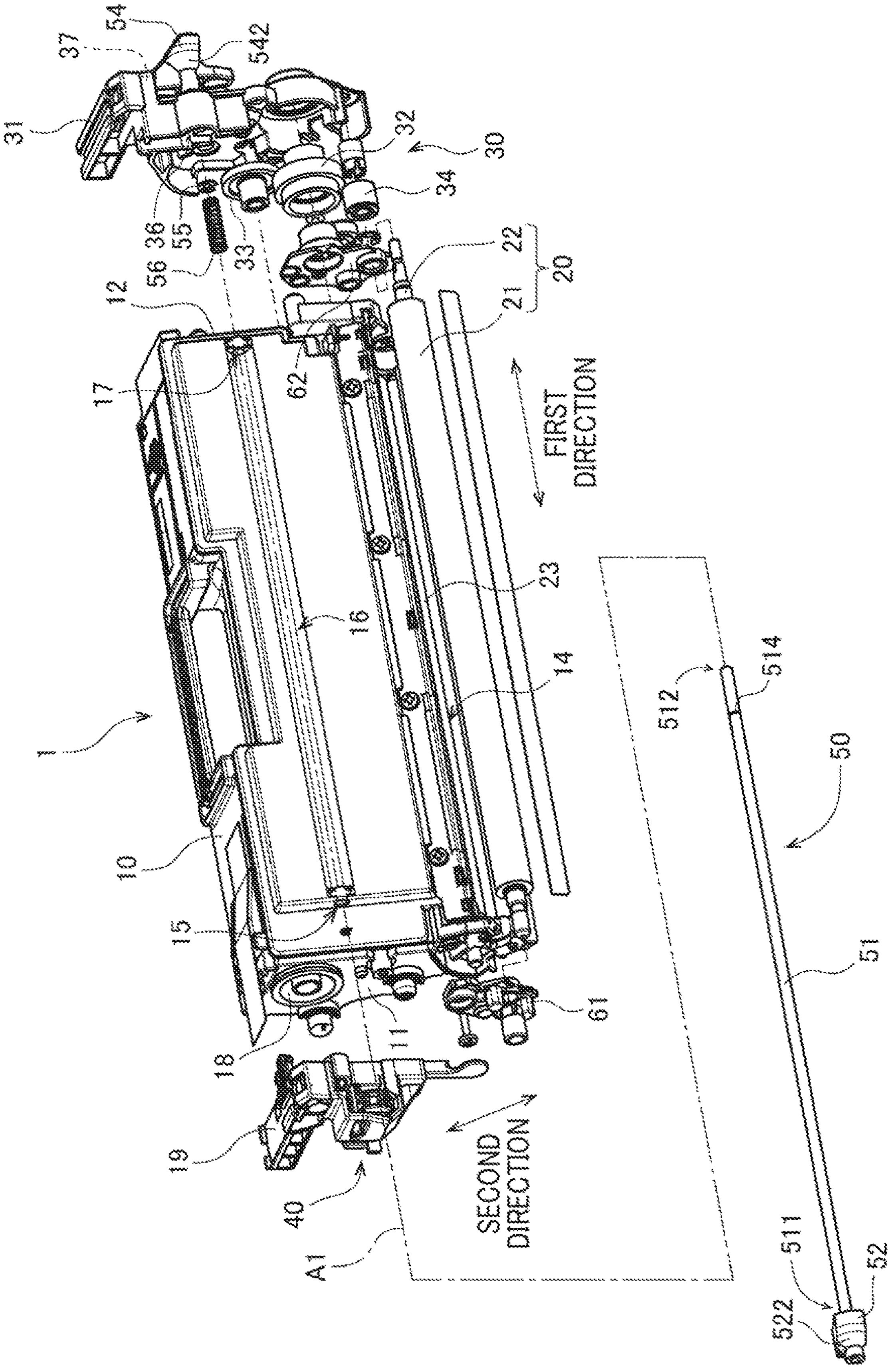
FIG. 5 is an exploded perspective view of the developing cartridge.

FIGS. 3 and 4 are perspective views of the developing cartridge 1. FIG. 5 is an exploded perspective view of the developing cartridge 1. As illustrated in FIGS. 3 through 5, the developing cartridge 1 includes a casing 10, a developing roller 20, a gear portion 30, a memory assembly 40, and a separating unit 50.

The casing 10 is configured to store developing agent therein. The casing 10 has a first outer surface 11, and a second outer surface 12. The first outer surface 11 is positioned at one end of the casing 10 in the first direction. The second outer surface 12 is positioned at another end of the casing 10 in the first direction. The first outer surface 11 and the second outer surface 12 are spaced apart from each other in the first direction. The casing 10 extends in the first direction as well as in the second direction between the first outer surface 11 and the second outer surface 12.

An accommodation chamber 13 is provided inside the casing 10. The developing agent is accommodated in the accommodation chamber 13. Further, the casing 10 has an opening 14. The opening 14 is positioned at one end portion of the casing 10 in the second direction. An interior and an exterior of the casing 10 are communicated with each other through the opening 14.

As illustrated in FIG. 5, the casing 10 includes a cap 18 at the first outer surface 11. The cap 18 is attached to a supply opening positioned at the first outer surface 11 of the casing 10. The cap 18 is configured to cover the supply opening. The cap 18 is detached from the first outer surface 11 to supply developing agent into the casing 10. The developing agent is then supplied into the accommodation chamber 13 through the supply opening.

The developing cartridge 1 includes an agitator (not illustrated) positioned in the accommodation chamber 13 of the casing 10. The agitator includes a fin. An agitator gear 33 of the gear portion 30 is attached to one end portion of the agitator in the first direction. Specifically, the agitator gear 33 is fixed to the one end portion of the agitator in the first direction. As the agitator gear 33 rotates, the agitator rotates about an agitator axis extending in the first direction. And, the developing agent in the accommodation chamber 13 is agitated by the rotation of the fin.

Further, the casing 10 has a first through-hole 15, a groove 16, and a second through-hole 17. The first through-hole 15, the groove 16, and the second through-hole 17 are positioned at an outer surface of the casing 10. The first through-hole 15 is positioned at one end of the casing 10 in the first direction. The first through-hole 15 penetrates through a part of the casing 10 in the first direction. The second through-hole 17 is positioned at another end of the casing 10 in the first direction. The second through-hole 17 penetrates through a part of the casing 10 in the first direction. The groove 16 is positioned between the first through-hole 15 and the second through-hole 17. The groove 16 extends in the first direction at the outer surface of the casing 10.

The developing roller 20 is a roller rotatable about a developing axis extending in the first direction. The developing roller 20 is positioned at the opening 14 of the casing 10. That is, the developing roller 20 is positioned at the one end portion of the casing 10 in the second direction. The developing roller 20 includes a developing-roller body 21, and a developing-roller shaft 22. The developing-roller body 21 is a hollow cylindrical member extending in the first direction. The developing-roller body 21 is made of, for example, rubber having elasticity. The developing-roller shaft 22 is a solid cylindrical member extending in the first direction to penetrate through the developing-roller body 21. The developing-roller body 21 is attached to the developing-roller shaft 22. Specifically, the developing-roller body 21 is fixed to the developing-roller shaft 22. As a material of the developing-roller shaft 22, metal or electrically conductive resin is employed.

The developing cartridge 1 includes a first bearing 61, and a second bearing 62. The first bearing 61 is attached to the first outer surface 11 of the casing 10. Specifically, the first bearing 61 is fixed to the first outer surface 11 of the casing 10. The second bearing 62 is attached to the second outer surface 12 of the casing 10. Specifically, the second bearing 62 is fixed to the second outer surface 12 of the casing 10. One end portion of the developing-roller shaft 22 in the first direction is inserted in the first bearing 61. With this structure, the one end portion of the developing-roller shaft 22 in the first direction is supported so as to be rotatable about the developing axis extending in the first direction. Another end portion of the developing-roller shaft 22 in the first direction is inserted in the second bearing 62. With this structure, the other end portion of the developing-roller shaft 22 in the first direction is supported so as to be rotatable about the developing axis extending in the first direction.

Further, a developing-roller gear 34 of the gear portion 30 is attached to the other end portion of the developing-roller shaft 22 in the first direction. Specifically, the developing-roller gear 34 is fixed to the other end portion of the developing roller shaft 22 in the first direction. Accordingly, as the developing-roller gear 34 rotates, the developing-roller shaft 22 rotates to rotate the developing-roller body 21 together with the developing-roller shaft 22.

Incidentally, the developing roller shaft 22 may not penetrate through the developing-roller body 21 in the first direction. For example, the developing-roller shaft 22 may extend in the first direction from each end of the developing-roller body 21 in the first direction.

Further, the developing cartridge 1 includes a supply roller 23. The supply roller 23 is positioned between the developing roller 20 and the agitator. An outer peripheral surface of the supply roller 23 and an outer peripheral surface of the developing roller 20 are in contact with each other. The developing agent in the accommodation chamber

13 of the casing 10 is supplied to the developing roller 20 through the supply roller 23. Thereafter, the developing agent on the outer peripheral surface of the developing roller 20 is supplied to the photosensitive drum 92 of the drum unit 2. At this time, the developing agent is moved from the developing roller 20 to the photosensitive drum 92 according to an electrostatic latent image formed on an outer peripheral surface of the photosensitive drum 92. As such, the electrostatic latent image becomes a visible image on the outer peripheral surface of the photosensitive drum 92.

The gear portion 30 is positioned at the second outer surface 12 of the casing 10. The gear portion 30 includes a gear cover 31, a coupling 32, and a plurality of gears. The gear cover 31 is attached to the second outer surface 12 of the casing 10. Specifically, the gear cover 31 is fixed to the second outer surface 12 of the casing 10. The plurality of gears includes the above-described agitator gear 33 and the developing-roller gear 34. At least a part of the plurality of gears is positioned between the second outer surface 12 and the gear cover 31 in the first direction.

The coupling 32 is exposed through the gear cover 31. Upon attachment of the developing cartridge 1 attached to the drum unit 2 to the image forming apparatus 100, a drive shaft of the image forming apparatus 100 is configured to be connected to the coupling 32. Thus, the rotation of the drive shaft is transmitted to the agitator gear 33 and the developing-roller gear 34 through the coupling 32.

Incidentally, the plurality of gears in the gear portion 30 may transmit a rotational force by meshing engagement of gear teeth, or by frictional force. In the latter case, an outer peripheral surface of each gear may be made of rubber.

The gear cover 31 has a third through-hole 36, and a stop surface 37. The third through-hole 36 is positioned at the other end of the casing 10 in the first direction. The third through-hole 36 is positioned between the second through-hole 17 and a second cam 54 (described later) in the first direction. The stop surface 37 faces the second outer surface 12 of the casing 10 in the first direction. Further, the stop surface 37 faces a stop protrusion 543 (described later) of the second cam 54 in the first direction.

The memory assembly 40 is positioned at the first outer surface 11 of the casing 10. The memory assembly 40 includes the memory 41 as a storage medium, and a holder 42 holding the memory 41. The memory 41 is an IC chip, for example. The memory 41 is positioned on an outer surface of the holder 42.

The memory 41 is configured to store various information about the developing cartridge 1. Specifically, the memory 41 stores at least one of: a cumulative number of printed sheets using the developing roller 20; a cumulative rotation number of the developing roller 20; and a cumulative consumption amount of the developing agent. The information is information indicative of a service life of the developing cartridge 1. Further, the memory 41 may further store information such as the serial number of the developing cartridge 1, and a matching model therefor. The memory 41 has an electrical contact surface. The electrical contact surface is made of metal as a conductor.

As illustrated in FIGS. 3 through 5, the developing cartridge 1 includes a holder cover 19. The holder cover 19 is attached to the first outer surface 11 of the casing 10. Specifically, the holder cover 19 is fixed to the first outer surface 11 of the casing 10. The holder 42 is attached to the holder cover 19. The holder 42 is movable in the second direction relative to the casing 10 and the holder cover 19.

After the developing cartridges 1 attached to the drum unit 2 are attached to the image forming apparatus 100, each developing cartridge 1 can perform a separating operation relative to the drum unit 2 in response to supply of a driving force from the image forming apparatus 100 to the developing cartridge 1. The separating operation is an operation to move the developing cartridge 1 relative to the drum unit 2 from a contacting state where the developing roller 20 is in contact with the photosensitive drum 92 to a separated state where the developing roller 20 is separated away from the photosensitive drum 92. For example, in a case where monochromatic printing is to be performed in the image forming apparatus 100, the developing cartridges 1 for the colors of cyan, magenta, and yellow other than black perform the separating operations. However, the developing cartridge 1 for the color of black may also perform the separating operation.

The separating unit 50 is a mechanism for switching the developing cartridge 1 between the contacting state and the separated state. As illustrated in FIGS. 3 through 5, the separating unit 50 includes a shaft 51, a first cam 52, a first retaining ring 53, the second cam 54, a second retaining ring 55, and a spring 56.

The shaft 51 is positioned at the outer surface of the casing 10. The shaft 51 extends along a first axis A1 extending in the first direction. Specifically, the shaft 51 extends in the first direction along the groove 16 of the casing 10. Further, the shaft 51 is inserted in the first through-hole 15, the second through-hole 17, and the third through-hole 36. The shaft 51 is, for example, solid cylindrical. However, the shaft 51 may have a prismatic columnar shape. The shaft 51 has one end portion 511, and another end portion 512. The one end portion 511 is positioned at one end of the shaft 51 in the first direction. The other end portion 512 is positioned at another end portion of the shaft 51 in the first direction. The shaft 51 is made of, for example, metal such as iron.

The first cam 52 is attached to the one end portion 511 of the shaft 51. Specifically, the first cam 52 has a first hole 521. The first hole 521 extends, from a surface of the first cam 52 that faces the second cam 54, in a direction away from the second cam 54 in the first direction. The one end portion 511 of the shaft 51 is inserted in the first hole 521. The first cam 52 is positioned at the first outer surface 11 of the casing 10. As a material of the first cam 52, for example, resin is employed.

The first cam 52 has a first sloped surface 522. The first sloped surface 522 is positioned at a part of a peripheral surface of the first cam 52 centered on the first axis A1. The first sloped surface 522 is inclined with respect to the first direction. The first sloped surface 522 extends to be separated farther away from the developing roller 20 in the second direction as extending away from the second cam 54 in the first direction. That is, the first sloped surface 522 extends to approach the shaft 51 in a radial direction with respect to the first axis A1 as extending away from the other end portion 512 of the shaft 51 in the first direction.

The first retaining ring 53 is a member for preventing the first cam 52 from detaching from the one end portion 511 of the shaft 51. The first retaining ring 53 is a plate-like member having a generally C-shape. The shaft 51 has an annular first groove 513 (see FIG. 8) on an outer peripheral surface of the one end portion 511 of the shaft 51. The first retaining ring 53 is attached to the first groove 513. In a state where the first cam 52 and the first retaining ring 53 are attached to the shaft 51, the first retaining ring 53 is positioned between one end portion of the first cam 52 in the first direction and another end portion of the first cam 52 in the first direction. That is, the other end portion of the first cam 52 in the first direction is positioned closer to the other end portion 512 of the shaft 51 than the first retaining ring 53 attached to the first groove 513 of the shaft 51 is to the other end portion 512 of the shaft 51 in the first direction. The other end portion of the first cam 52 and the first retaining ring 53 face each other in the first direction. This structure prevents the first cam 52 from coming off the one end portion 511 of the shaft 51 in the first direction.

The second cam 54 is attached to the other end portion 512 of the shaft 51. Specifically, the second cam 54 has a second hole 541. The second hole 541 extends, from a surface of the second cam 54 that faces the first cam 52, in a direction away from the first cam 52 in the first direction. The other end portion 512 of the shaft 51 is inserted in the second hole 541. The second cam 54 is positioned at the second outer surface 12 of the casing 10. The second cam 54 is positioned closer to the other end portion 512 of the shaft 51 than the third through-hole 36 of the gear cover 31 is to the other end portion 512 of the shaft 51. As a material of the second cam 54, for example, resin is employed.

The second cam 54 has a second sloped surface 542. The second sloped surface 542 is positioned at a part of a peripheral surface of the second cam 54 centered on the first axis A1. The second sloped surface 542 is inclined with respect to the first direction. The second sloped surface 542 extends to be separated farther away from the developing roller 20 in the second direction as extending toward the first cam 52 in the first direction. That is, the second sloped surface 542 extends to approach the shaft 51 in the radial direction with respect to the first axis A1 as extending toward the one end portion 511 of the shaft 51.

As illustrated in FIG. 3, the second cam 54 has the stop protrusion 543. The stop protrusion 543 protrudes from an outer surface of the second cam 54 outwardly in a radial direction of the shaft 51. The stop protrusion 543 and the stop surface 37 of the gear cover 31 face each other in the first direction. Further, the stop protrusion 543 and the stop surface 37 are configured to make contact with each other in the first direction. This configuration prevents the second cam 54 from coming off the other end portion 512 of the shaft 51 in the first direction.

The second retaining ring 55 is a member for receiving an urging force of the spring 56. The second retaining ring 55 is positioned between the spring 56 and the second cam 54 in the first direction. The second retaining ring 55 is a plate-like member having a generally C-shape. The shaft 51 has an annular second groove 514 on the outer peripheral surface of the other end portion 512 of the shaft 51. The second retaining ring 55 is attached to the second groove 514.

The shaft 51 is movable, relative to the casing 10, in the first direction between a first position and a second position. The first cam 52, the first retaining ring 53, the second cam 54, and the second retaining ring 55 are movable together with the shaft 51 in the first direction relative to the casing 10. The first cam 52 is positioned closer to the casing 10 in the first direction in a case where the shaft 51 is at the first position than in a case where the shaft 51 is at the second position. The second cam 54 is positioned farther from the casing 10 in the first direction in the case where the shaft 51 is at the first position than in the case where the shaft 51 is at the second position. That is, the movement from the first position to the second position is a movement in a direction from the second cam 54 toward the first cam 52. The movement from the second position to the first position is a movement in a direction from the first cam 52 toward the second cam 54.

The spring 56 is a resiliently urging member configured to extend and compress in the first direction. The spring 56 is attached to the other end portion 512 of the shaft 51. The spring 56 is positioned between the second outer surface 12 of the casing 10 and the second cam 54 in the first direction. Specifically, the spring 56 is positioned between the second outer surface 12 of the casing 10 and the third through-hole 36 of the gear cover 31 in the first direction. One end of the spring 56 in the first direction is in contact with the second outer surface 12 of the casing 10. Another end of the spring 56 in the first direction is in contact with the second retaining ring 55. The spring 56 according to the present embodiment is a coil spring in a spiral shape. The other end portion 512 of the shaft 51 is inserted in an interior of the spring 56.

The spring 56 is configured to expand and compress in the first direction between a first state and a second state. The spring 56 is in the first state in the case where the shaft 51 is at the first position. The spring 56 is in the second state in the case where the shaft 51 is at the second position. A length of the spring 56 in the first direction is longer in the first state than in the second state. Further, the spring 56 is compressed to be shorter than a natural length of the spring 56 in a state where the gear cover 31 and the shaft 51 are attached to the casing 10, and the second cam 54, the second retaining ring 55, and the spring 56 are attached to the shaft 51. Hence, the shaft 51 is urged toward the first position from the first position by a repulsive force of the spring 56.

3. Separating Operation

For performing the separating operation, a lever (not illustrated) is configured to protrude, from the main frame 101, toward the second cam 54 of the developing cartridge 1 in the image forming apparatus 100. Hence, the second cam 54 is pushed by the lever. The second cam 54 is pressed in a direction from the second cam 54 toward the first cam 52 in the first direction. Accordingly, the spring 56 is compressed from the first state to the second state, and the shaft 51 is moved from the first position to the second position.

At this time, the first sloped surface 522 of the first cam 52 moves in the first direction while making contact with a part of the drum frame 91. Hence, the first cam 52 moves in the second direction, relative to the drum frame 91, in a direction away from the photosensitive drum 92. Similarly, the second sloped surface 542 of the second cam 54 moves in the first direction while making contact with another part of the drum frame 91. Hence, the second cam 54 moves in the second direction, relative to the drum frame 91, in the direction away from the photosensitive drum 92.

The casing 10 and the developing roller 20 move in the second direction, relative to the drum frame 91, together with the shaft 51, the first cam 52, and the second cam 54, in the direction away from the photosensitive drum 92. As a result, the position of the developing cartridge 1 is switched from the contacting position where the developing roller 20 is in contact with the photosensitive drum 92 to the separated position where the developing roller 20 is separated away from the photosensitive drum 92.

4. Assembling of Developing Cartridge

Figure 6:
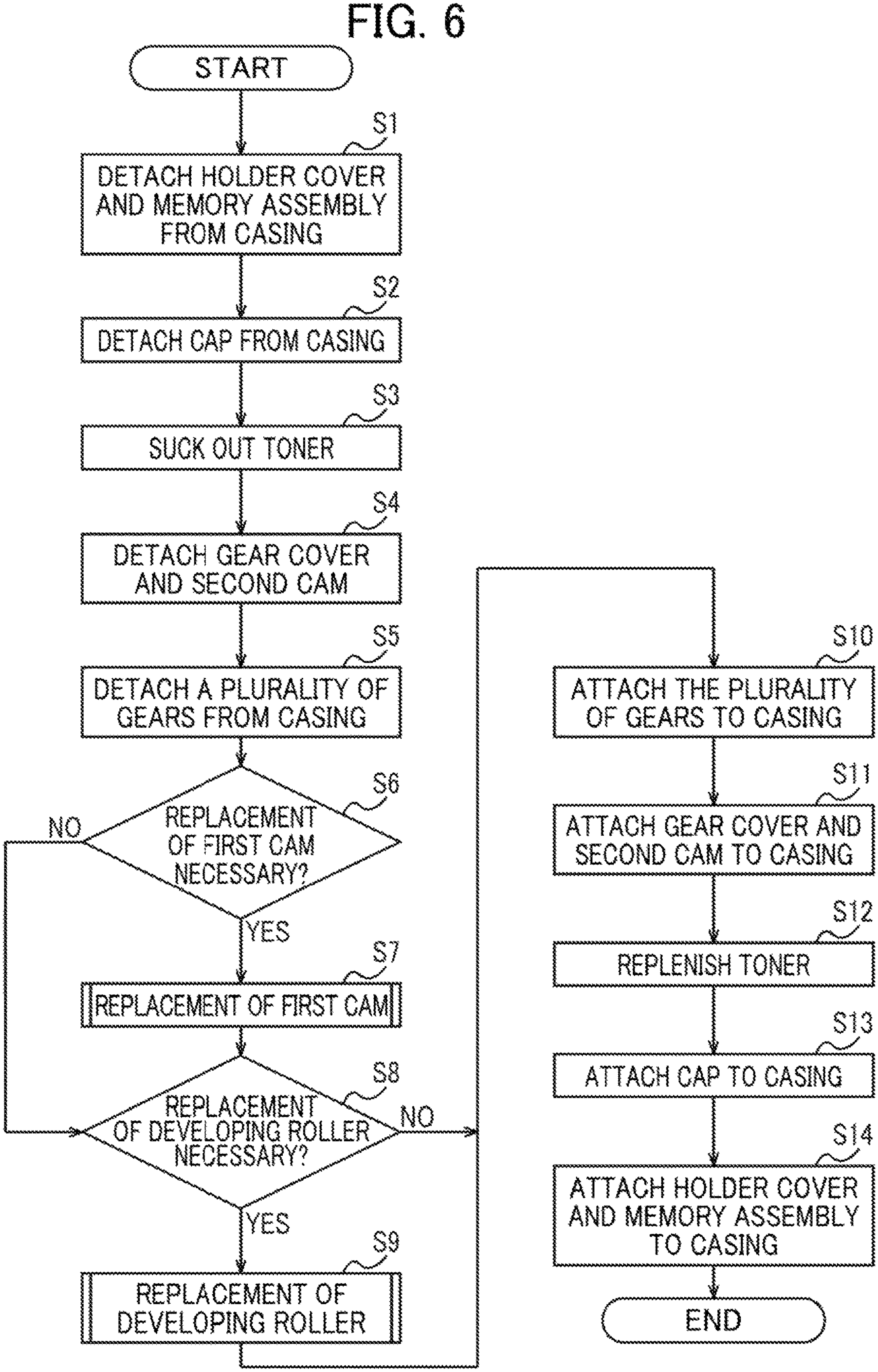
FIG. 6 is a flowchart illustrating procedures for assembly of the developing cartridge.

Next, procedures for assembling the developing cartridge 1 will be described. The developing cartridge 1 is assembled when the developing cartridge 1 is manufactured or recycled. Recycling of the developing cartridge 1 is a work to render the developing cartridge 1 back into a reusable state through an inspection of the used developing cartridge 1, replacement of parts and components of the developing cartridge 1 as needed, and refilling developing agent in the accommodation chamber 13 of the developing cartridge 1. FIG. 6 is a flowchart illustrating a recycling procedure as one example of assembling of the developing cartridge 1.

For performing recycling as one example of assembling of the developing cartridge 1, an operator first detaches the holder cover 19 and the memory assembly 40 from the casing 10 (step S1). Then, the operator removes the memory 41 from the holder 42, and attaches a new memory 41 to the holder 42. Next, the operator detaches the cap 18 from the first outer surface 11 of the casing 10 (step S2). Then, the operator sucks out the toner remaining in the accommodation chamber 13 of the casing 10 through the supply opening (step S3).

Next, the operator detaches the gear cover 31 from the second outer surface 12 of the casing 10. Specifically, the operator detaches, from the casing 10 and the gear cover 31, bolts fixing the gear cover 31 to the second outer surface 12 of the casing 10. Further, concurrently with the detachment of the gear cover 31 from the second outer surface 12 of the casing 10, the operator detaches the second cam 54 from the other end portion 512 of the shaft 51, and takes the other end portion 512 of the shaft 51 out of the third through-hole 36 (step S4). Further, the operator detaches the plurality of gears of the gear portion 30 from the second outer surface 12 of the casing 10 (step S5).

Subsequently, the operator determines whether the first cam 52 needs to be replaced or not (step S6). In a case where the operator determines that replacement of the first cam 52 is necessary (step S6: YES), the operator performs a work to replace the first cam 52 (step S7).

Figure 7:
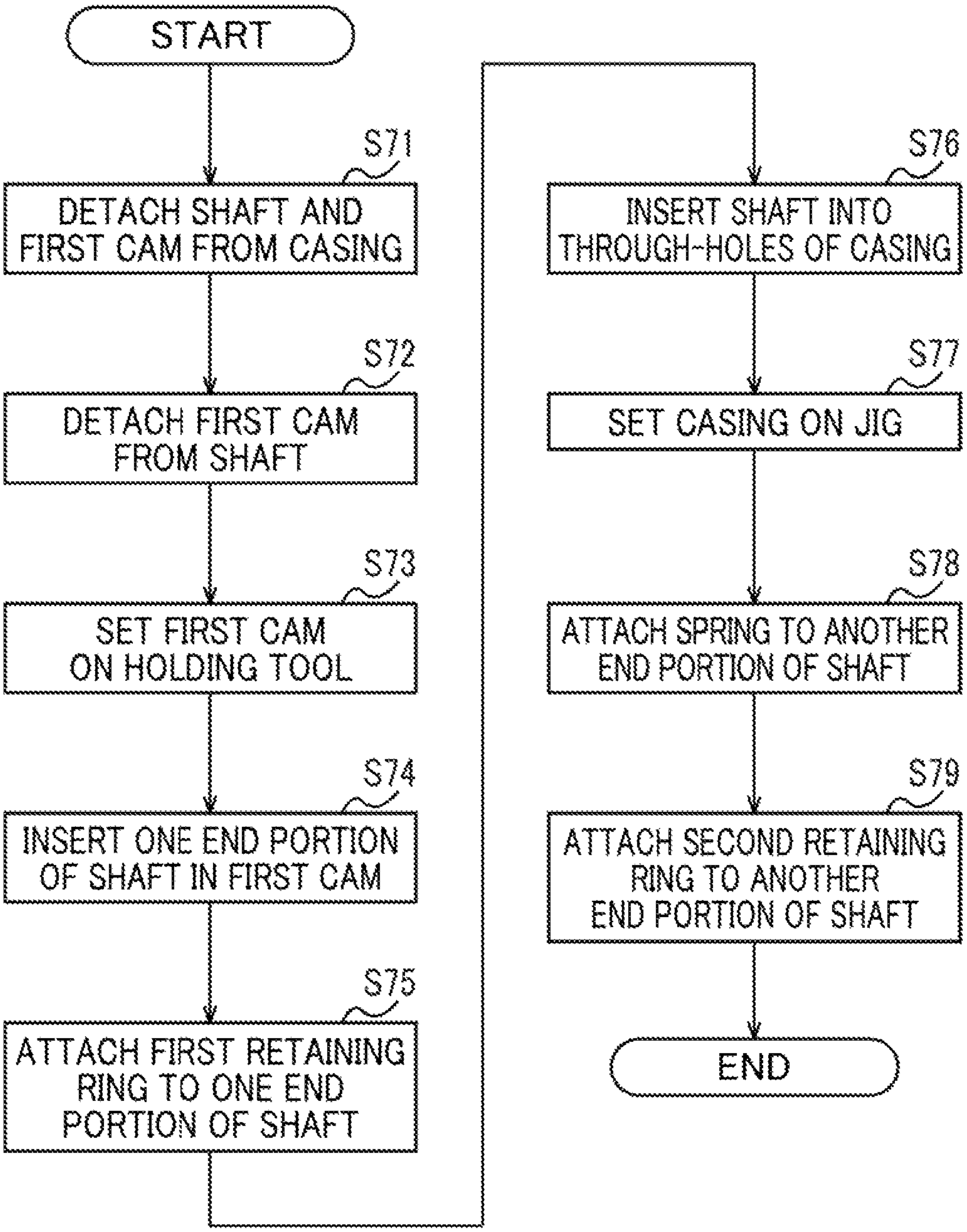
FIG. 7 is a flowchart illustrating procedures for replacement of a first cam.

FIG. 7 is a flowchart illustrating procedures to perform the replacement work on the first cam 52. As illustrated in FIG. 7, for exchanging the first cam 52, the operator first detaches, from the casing 10, the shaft 51 to which the first cam 52 is attached (step S71). Specifically, the operator moves the shaft 51 to which the first cam 52 is attached in the direction from the other end portion 512 toward the one end portion 511 of the shaft 51. In this way, the operator pulls out the shaft 51 from the second through-hole 17, the groove 16, and the first through-hole 15 of the casing 10.

Subsequently, the operator detaches the first retaining ring 53 from the one end portion 511 of the shaft 51. Then, the operator pulls out the one end portion 511 of the shaft 51 from the first hole 521 of the first cam 52. Thus, the operator detaches the used first cam 52 from the shaft 51 (step S72).

Figure 8:
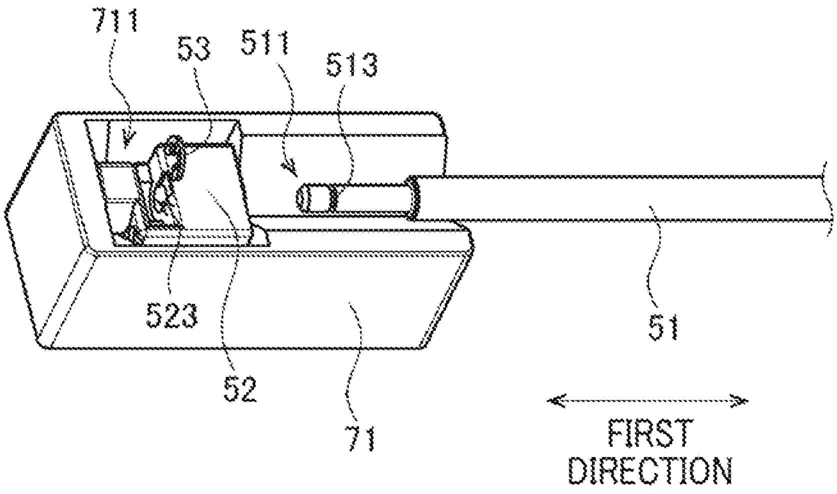
FIG. 8 is a view illustrating a state where the first cam is held by a holding tool.

Thereafter, the operator prepares a new first cam 52. The operator then sets the new first cam 52 to be held in a holding tool 71 (step S73). FIG. 8 is a view illustrating a state where the first cam 52 is held by the holding tool 71. As illustrated in FIG. 8, the holding tool 71 has a first recessed portion 711 configured to hold the first cam 52. The operator inserts the first cam 52 in the first recessed portion 711. The outer surface of the first cam 52 comes into contact with an inner surface of the holding tool 71. This structure restrains displacement of the first cam 52 relative to the holding tool 71.

In this state, the operator inserts the one end portion 511 of the shaft 51 in the first hole 521 of the first cam 52 (step S74). At this time, the holding tool 71 restrains displacement of the first cam 52. Accordingly, the one end portion 511 of the shaft 51 can be easily inserted in the first hole 521 of the first cam 52.

As illustrated in FIG. 8, the first cam 52 has a slit 523. The slit 523 is a through-hole extending outwardly in the radial direction of the shaft 51 from the first hole 521 of the first cam 52. After the step S74, the operator attaches the first retaining ring 53 to the first groove 513 of the one end portion 511 of the shaft 51 through the slit 523 in a state where the first cam 52 and the shaft 51 are held by the holding tool 71 (step S75).

Figure 9:
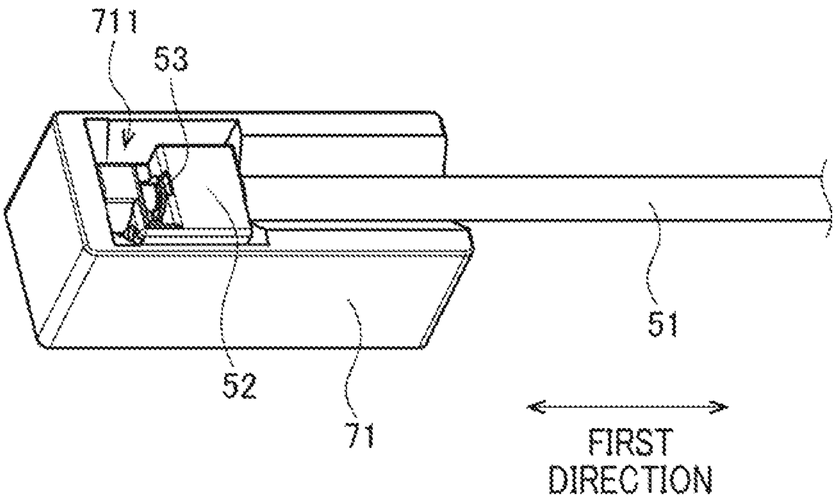
FIG. 9 is a view illustrating a state where attachment of the first cam and a retaining ring to a shaft is completed.

FIG. 9 is a view illustrating a state where the step S75 is complete. In the step S75, displacement of the first cam 52 and the shaft 51 are restrained by the holding tool 71. Hence, the one end portion 511 of the shaft 51 is restrained from coming off the first hole 521 of the first cam 52. Accordingly, the operator can easily attach the first retaining ring 53 to the first groove 513 of the shaft 51.

Thereafter, the operator inserts the shaft 51 to which the first cam 52 has been attached into the first through-hole 15, the groove 16, and the second through-hole 17 of the casing 10 (step S76). Hence, the shaft 51 to which the first cam has been attached is attached to the casing 10.

Figure 10:
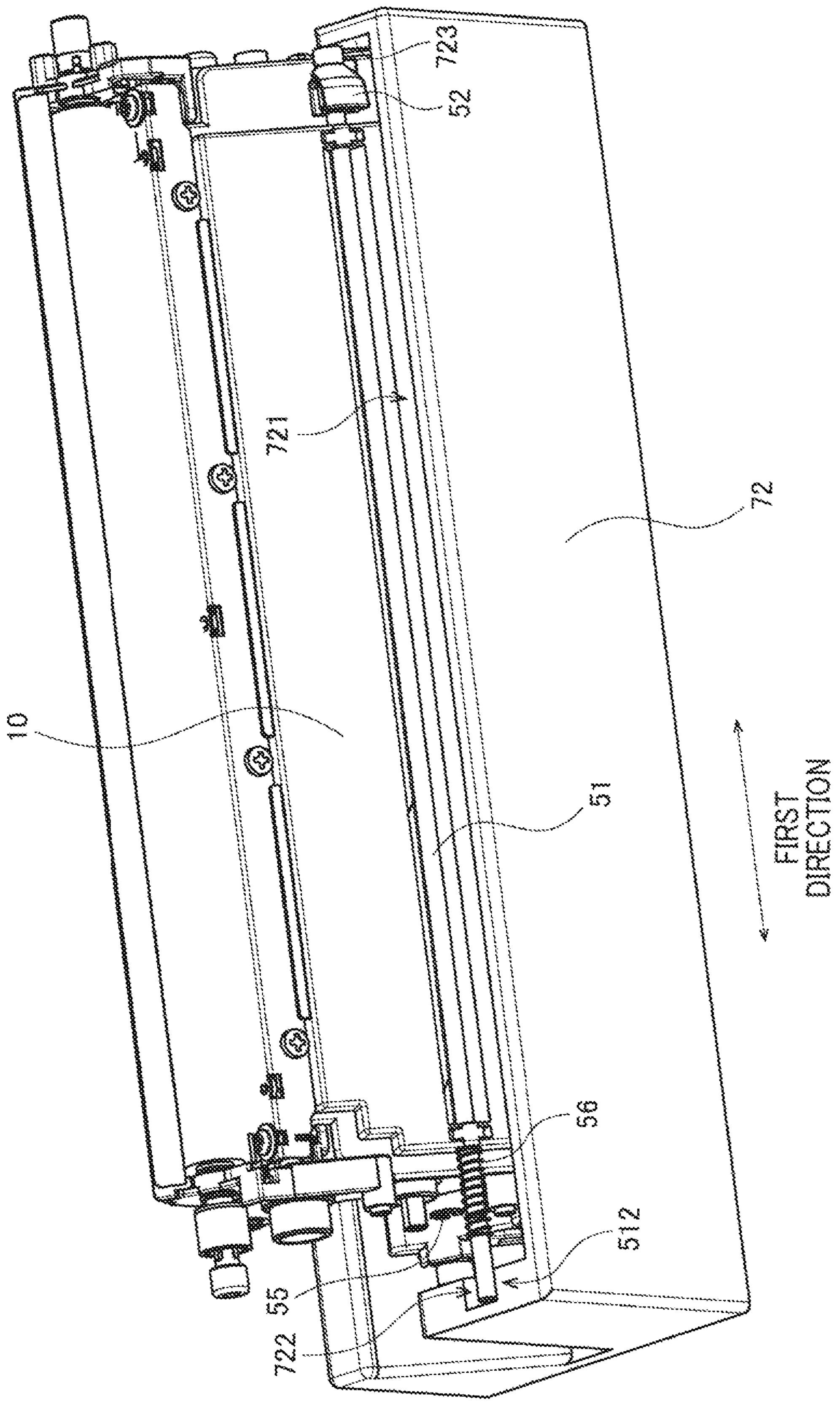
FIG. 10 is a view illustrating a state where a casing is held by a jig.
Figure 11:
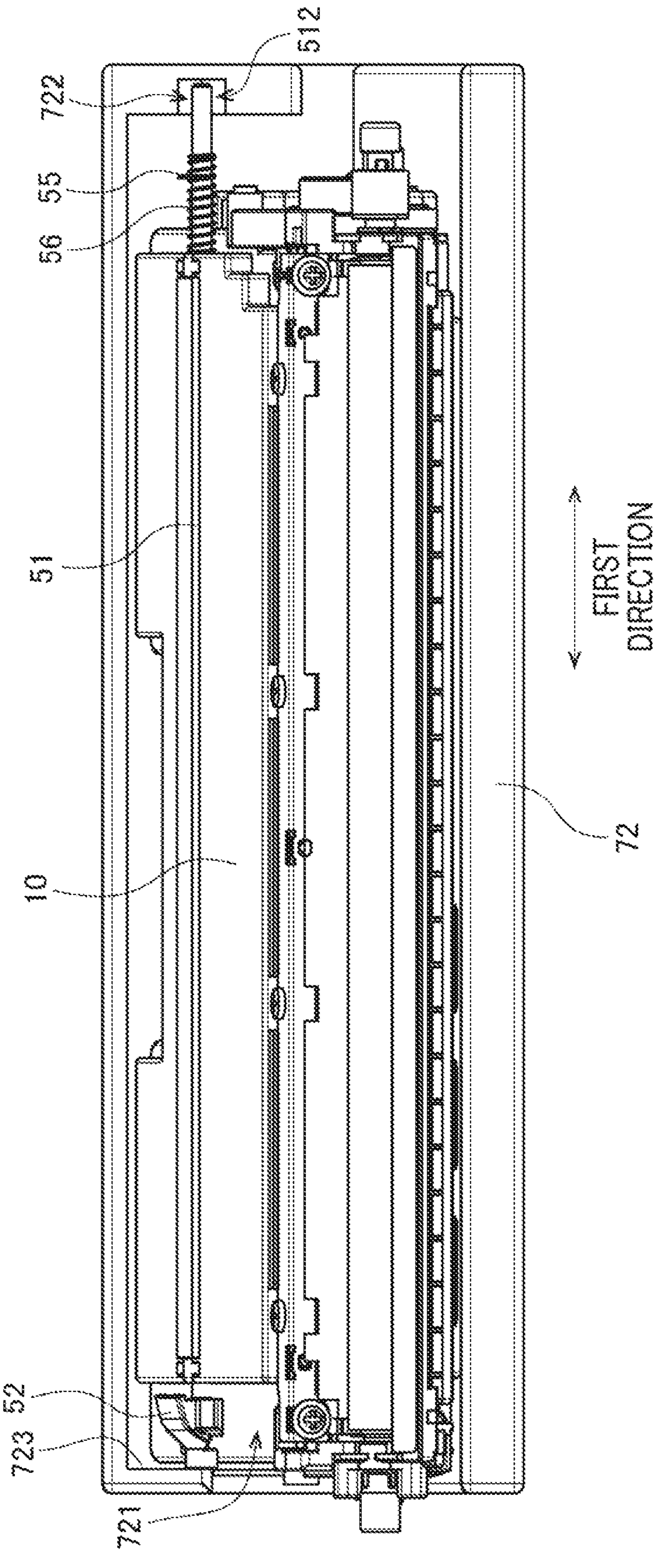
FIG. 11 is a view illustrating the state where the casing is held by the jig.

Subsequently, the operator sets the casing 10 to be held by a jig 72 (step S77). FIGS. 10 and 11 are views illustrating a state where the casing 10 is held by the jig 72. As illustrated in FIGS. 10 and 11, the jig 72 has a second recessed portion 721 configured to hold the casing 10, and a third recessed portion 722 configured to hold the other end portion 512 of the shaft 51. The operator inserts the casing 10 in the second recessed portion 721, and inserts the other end portion 512 of the shaft 51 in the third recessed portion 722. Hence, displacement of the casing 10 and the shaft 51 relative to the jig 72 is restrained. Further, the first cam 52 is in contact with an inner surface 723 of the second recessed portion 721 of the jig 72.

In this state, the operator slightly lifts up the other end portion 512 of the shaft 51 from the third recessed portion 722, and attaches the spring 56 to the other end portion 512 of the shaft 51 (step S78).

At this time, the inner surface 723 of the jig 72 contacts the first cam 52 in the first direction. Specifically, the inner surface 723 of the jig 72 contacts the first cam 52 in a direction toward the other end portion 512 from the one end portion 511 of the shaft 51. Hence, the position of the shaft 51 is fixed at the first position. Displacement of the shaft 51 from the first position to the second position is prevented by the inner surface 723 of the jig 72. Accordingly, the operator can easily attach the spring 56 to the other end portion 512 of the shaft 51.

Further, a protruding length of the shaft 51 protruding in the first direction from the second outer surface 12 of the casing 10 is greater when the shaft 51 is at the first position than when the shaft 51 is at the second position. Accordingly, the operator can attach the spring 56 to the other end portion 512 of the shaft 51 more easily.

Subsequently, the operator attaches the second retaining ring 55 to the other end portion 512 of the shaft 51 in the state where the casing 10 is held by the jig 72 (step S79). Specifically, the operator attaches the second retaining ring 55 to the second groove 514 of the shaft 51 while the other end portion 512 of the shaft 51 is inserted in the second recessed portion 721 of the jig 72.

At this time, the inner surface 723 of the jig 72 contacts the first cam 52 in the first direction. Specifically, the inner surface 723 of the jig 72 contacts the first cam 52 in a direction toward the other end portion 512 of the shaft 51 from the one end portion 511 of the shaft 51. Hence, the position of the shaft 51 is fixed at the first position. Displacement of the shaft 51 from the first position to the second position is prevented by the inner surface 723 of the jig 72. Accordingly, the operator can easily attach the second retaining ring 55 to the other end portion 512 of the shaft 51.

Further, the protruding length of the shaft 51 protruding in the first direction from the second outer surface 12 of the casing 10 is greater when the shaft 51 is at the first position than when the shaft 51 is at the second position. Accordingly, the operator can attach the second retaining ring 55 to the other end portion 512 of the shaft 51 more easily.

Turning back to FIG. 6, in a case where the operator determines that exchange of the first cam 52 is unnecessary in the step S6 (step S6: No), or in a case where the replacement work in the step S7 is finished, then, the operator determines whether replacement of the developing roller 20 is necessary (step S8). In a case where the replacement of the developing roller 20 is determined to be necessary (step S8: Yes), the operator performs an exchanging work for the developing roller 20 (step S9).

Figure 12:
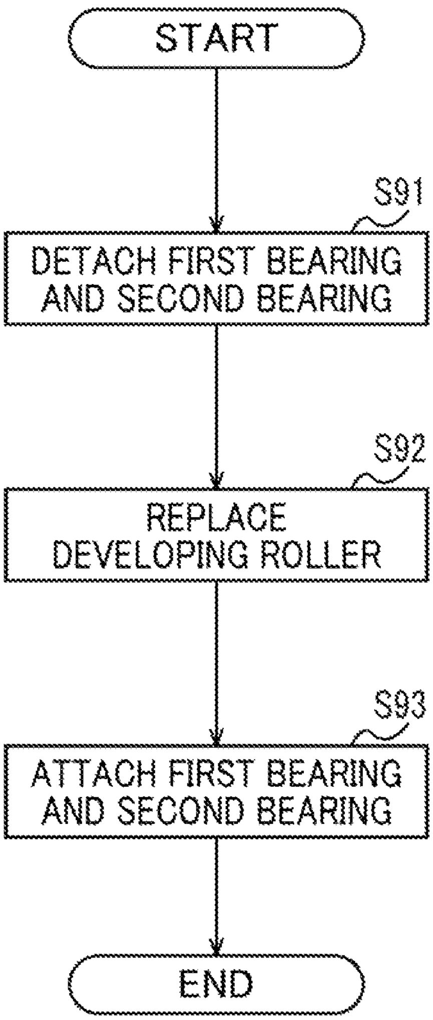
FIG. 12 is a flowchart illustrating procedures for replacement of a developing roller.

FIG. 12 is a flowchart illustrating procedures to replace the developing roller 20. As illustrated in FIG. 12, for performing the replacement of the developing roller 20, the operator first detaches the first bearing 61 and the second bearing 62 from the casing 10 (step S91). Specifically, the operator detaches the first bearing 61 from the first outer surface 11 of the casing 10, and pulls the one end portion in the first direction of the developing roller shaft 22 out of the first bearing 61. Further, the operator detaches the second bearing 62 from the second outer surface 12 of the casing 10, and pulls the other end portion in the first direction of the developing roller shaft 22 out of the second bearing 62.

Next, the operator replaces the used developing roller 20 with a new developing roller 20 (step S92). Specifically, the operator removes the used developing roller 20 through the opening 14 of the casing 10, and attaches a new developing roller 20 at the opening 14 of the casing 10.

Thereafter, the operator attaches the first bearing 61 and the second bearing 62 to the casing 10 (step S93). Specifically, the operator inserts the one end portion in the first direction of the developing roller shaft 22 into the first bearing 61, and attaches the first bearing 61 to the first outer surface 11 of the casing 10. More specifically, the operator inserts the one end portion in the first direction of the developing roller shaft 22 into the first bearing 61, and fixes the first bearing 61 to the first outer surface 11 of the casing 10. Further, the operator inserts the other end portion in the first direction of the developing roller shaft 22 into the second bearing 62, and attaches the second bearing 62 to the second outer surface 12 of the casing 10. More specifically, the operator inserts the other end portion in the first direction of the developing roller shaft 22 into the second bearing 62, and fixes the second bearing 62 to the second outer surface 12 of the casing 10.

Turning back to FIG. 6, in a case where the operator determines that replacement of the developing roller 20 is unnecessary (step S8: No) or in a case where the work in the step S9 is finished, then, the operator attaches the plurality of gears of the gear portion 30 to the second outer surface 12 of the casing 10 (step S10).

Subsequently, the operator attaches the second cam 54 to the other end portion 512 of the shaft 51, and attaches the gear cover 31 to the second outer surface 12 of the casing 10 (step S11). Specifically, the operator inserts the other end portion 512 of the shaft 51 attached to the casing 10 into the third through-hole 36 of the gear cover 31. Thereafter, the operator inserts the other end portion 512 of the shaft 51 into the second hole 541 of the second cam 54. The operator then arranges the stop protrusion 543 of the second cam 54 to face the stop surface 37 of the gear cover 31 in the first direction. Thereafter, the operator fixes the gear cover 31 to the second outer surface 12 of the casing 10 with the bolts.

In the step S11, the operator may attach the second cam 54 that has been detached in the step S4 to the shaft 51. Further, in a case where the operator determines that replacement of the second cam 54 is necessary, the operator may dispose of the second cam 54 detached from the shaft 51 in the step S4 and attach a new second cam 54 to the shaft 51 in the step S11.

Thereafter, the operator supplies new developing agent into the accommodation chamber 13 of the casing 10 through the supply opening of the casing 10 (step S12). The operator attaches the cap 18 to the supply opening of the casing 10 upon completion of filling of the accommodation chamber 13 with the developing agent. Thereafter, the operator attaches the holder cover 19 and the memory assembly 40 to the first outer surface 11 of the casing 10 (step S14).

5. Modifications

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

The operator may replace the shaft 51 in performing the assembling of the developing cartridge 1. Specifically, the operator may replace the shaft 51 at the time of recycling of the developing cartridge 1. In a case where replacement of the shaft 51 is determined to be necessary, the operator may dispose of the shaft 51 detached from the first cam 52 in the step S72 and may attach a new shaft 51 to the first cam 52 in the step S74.

Further, the operator may replace a gear of the gear portion 30 with a new gear in performing the assembling of the developing cartridge 1. Specifically, the operator may replace the gear of the gear portion 30 at the time of recycling of the developing cartridge 1. In a case where the operator determines that replacement of the gear is necessary, the operator may dispose of the gear detached from the second outer surface 12 of the casing 10 in the step S5, and may attach a new gear to the second outer surface 12 of the casing 10 in the step S10.

Further, recycling of the developing cartridge 1 has been described in the above-described embodiment. The recycling the developing cartridge 1 includes a method of: disassembling partial components of the developing cartridge 1; and reassembling the developing cartridge 1. However, in a manufacturing process of the developing cartridge 1, the developing cartridge 1 may be assembled by the same method as the assembling work included in the above-described recycling.

Further, in the above-described embodiment, the coil spring is used as the resiliently urging member. However, instead of the coil spring, other types of springs such as a leaf spring and a torsion spring may be used. Further, instead of the spring, other kinds of urging member such as rubber and sponge may be used.

Further, in the above-described embodiment, the drum unit 2 is a drawer to which the four developing cartridges 1 are attachable. However, the drum unit may be a drum cartridge to which a single developing cartridge 1 is attachable.

Further, each element used in the above-described embodiment and modifications may be suitably combined together as long as no contradiction is generated.

What is claimed is:

1. A method of assembling a developing cartridge, the developing cartridge including:

a casing configured to accommodate developing agent and having a through-hole extending in a first direction;

a shaft extending in the first direction through the through-hole and movable in the first direction relative to the casing;

a first cam positioned at one end portion of the shaft in the first direction, the first cam being movable together with the shaft in the first direction relative to the casing;

a second cam positioned at another end portion of the shaft in the first direction, the second cam being movable together with the shaft in the first direction relative to the casing; and a resiliently urging member attached to the another end portion of the shaft and positioned between the casing and the second cam, the resiliently urging member being configured to expand and compress in the first direction, the method comprising steps of:

(a) attaching the first cam to the one end portion of the shaft;

(b) inserting the shaft to which the first cam is attached in the through-hole after the step (a); and (c) after the step (b), attaching the resiliently urging member to the another end portion of the shaft in a state where the first cam is in contact with a jig in a direction from the one end portion toward the another end portion of the shaft in the first direction.

2. The method of assembling according to claim 1, wherein the first cam has a first hole in which the one end portion of the shaft is to be inserted, wherein the developing cartridge further includes a first retaining ring attached to the one end portion of the shaft and configured to prevent the first cam from coming off the one end portion of the shaft, and wherein the step (a) comprises steps of:

(a-1) inserting the one end portion of the shaft in the first hole; and (a-2) after the step (a-1), attaching the first retaining ring to the one end portion of the shaft in a state where the first cam and the shaft are held by a holding tool.

3. The method of assembling according to claim 2, wherein the developing cartridge further includes a second retaining ring attached to the another end portion of the shaft, and wherein the method of assembling further comprises a step of:

(d) after the step (c), attaching the second retaining ring to the another end portion of the shaft in the state where the first cam is in contact with the jig in the first direction.

4. The method of assembling according to claim 3, wherein the second retaining ring is positioned between the resiliently urging member and the second cam in the first direction, and wherein the method of assembling further comprises a step of:

(e) after the step (d), attaching the second cam to the another end portion of the shaft.

5. The method of assembling according to claim 4, wherein the casing has a first outer surface at which the first cam is positioned and a second outer surface at which the second cam is positioned, wherein the developing cartridge further includes a gear cover fixed to the second outer surface, the gear cover having a stop surface facing the second cam in the first direction, and wherein, in the step (e), the second cam is attached to the another end portion of the shaft, and the gear cover is attached to the second outer surface of the casing.

6. The method of assembling according to claim 5, wherein the developing cartridge further includes:

a developing roller extending in the first direction;

a first bearing fixed to the first outer surface of the casing and supporting one end portion of the developing roller in the first direction; and a second bearing fixed to the second outer surface of the casing and supporting another end portion of the developing roller in the first direction, and wherein the method of assembling further comprises a step of:

attaching the first bearing, the second bearing, and the developing roller to the casing after the steps (a) through (d) and before the step (e).

7. The method of assembling according to claim 1, wherein the shaft is movable in the first direction relative to the casing between a first position and a second position, wherein the first cam is positioned closer to the casing when the shaft is at the first position than when the shaft is at the second position, and wherein, in the step (c), the resiliently urging member is attached to the another end portion of the shaft in a state where the shaft is positioned at the first position by the jig.

8. The method of assembling according to claim 1, wherein the resiliently urging member is a spring.

* * * * *